Patented Jan. 31, 1950

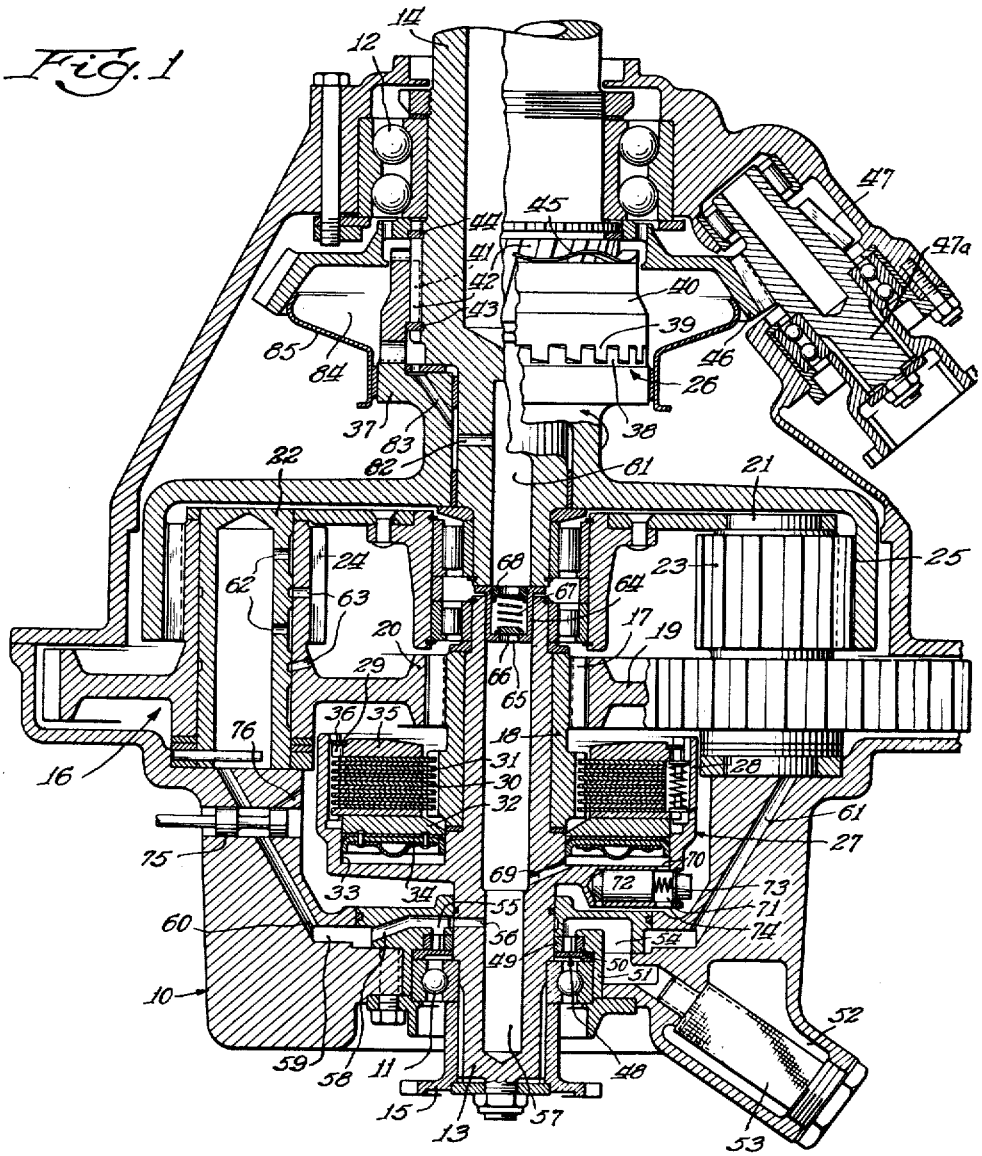

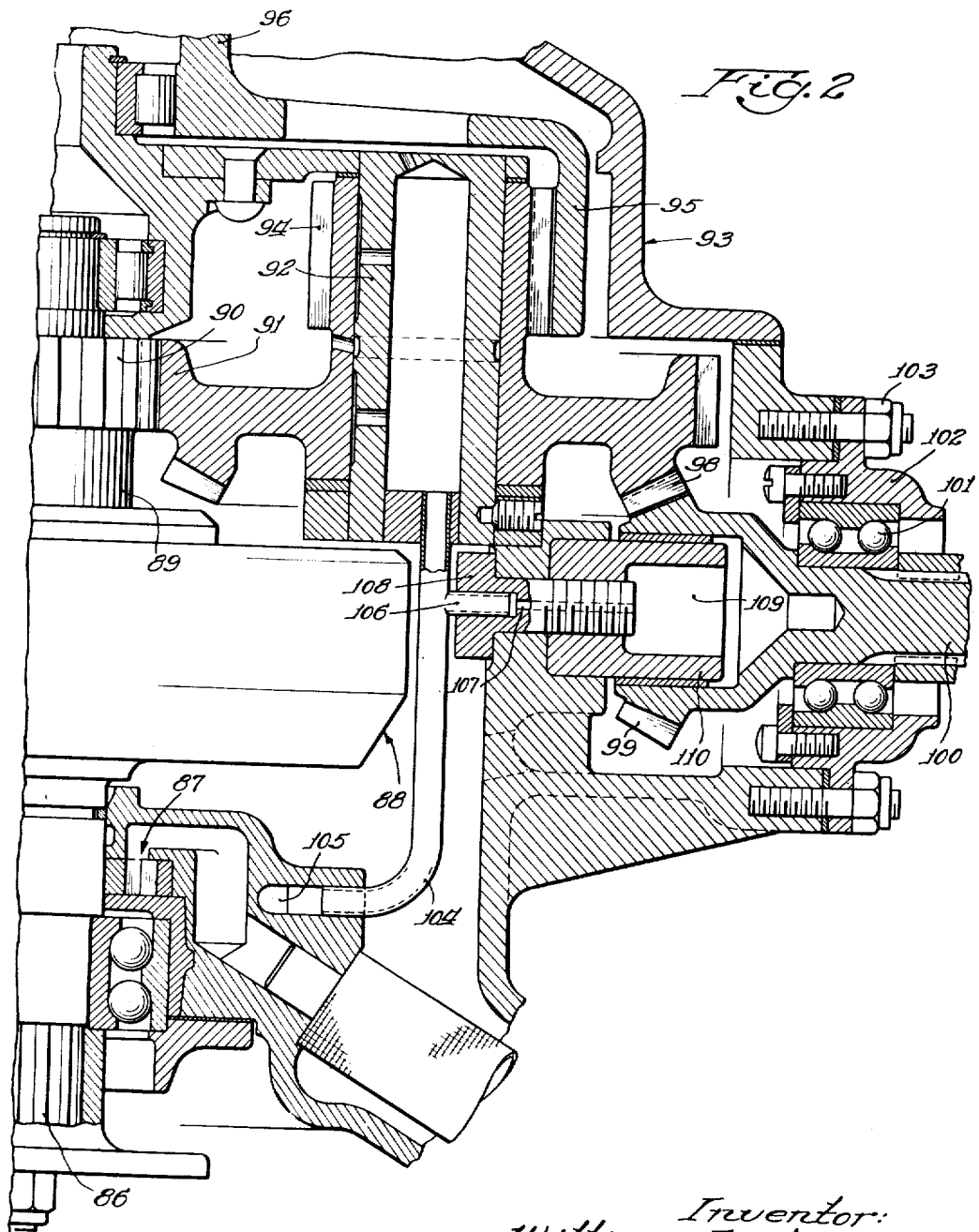

2,495,988

UNITED STATES PATENT OFFICE 2,495,988

TRANSMISSION GEARING

William L. Sheppard, Royal Oak, Mich., assignor to Borg-Warner Corporation, Chicago, Ill., a corporation of Illinois Application July 14, 1943, Serial No. 494,619

7 Claims. (Cl. 74—389)

This invention relates to transmissions of the gear type and particularly to transmissions in which the axis of rotation is disposed vertically as for example in transmissions for driving the main rotor blades of a helicopter.

It has been proposed in one form of transmission for a helicopter to disconnect the transmission from the prime mover by means of a clutch so that the engine could be tested without operating the sustaining rotor of the helicopter. The clutch is manually operated and is enclosed in a separate housing removed from the transmission.

One of the objects of this transmission is to simplify and lighten the transmission and clutch by incorporating the clutch in the transmission housing. Another object of the invention is to provide power means for operating the clutch, with automatic control means for the power means.

It has also been proposed in a helicopter to utilize a construction wherein the main rotor is automatically disconnected from the clutch by means of a one-way clutching device so that should the engine fail, the main rotor would still be effective to support the helicopter and thereby permit a gradual descent to the ground without power. The helicopter under consideration is also provided with a vertical tail rotor for controlling its lateral movement, this tail rotor being driven from the same engine and preferably at a reduced speed. Under a dead engine condition it is desirable that the tail rotor be operated simultaneously with the main rotor so as to provide better control during the descent. In the prior transmission, therefore, the one-way device is inserted between the transmission proper and the clutch so that the entire transmission must be driven by the rotor when the engine fails. This condition is not always desirable since, if the transmission is not functioning properly due to a burned out bearing or other mechanical failure, it is not possible to permit the rotors to turn without simultaneously operating the wrecked transmission.

Thus another object of this invention is to provide a one-way connection between the tail rotor and the transmission, the tail rotor being driven directly from the main rotor shaft.

Another and more specific object of this invention is to provide an alternative, simpler power take-off mechanism for driving the tail rotor of a helicopter.

These and other objects of the invention will become apparent from the following detailed description when taken together with the accompanying drawings in which:

Fig. 1 is an elevation in section of a transmission incorporating the above-described improved construction; and Fig. 2 is a fragmentary elevation in section taken through the alternative form of tail rotor take-off mechanism.

Referring now to Fig. 1 for a more detailed description of the invention, 10 is a housing preferably made of light-weight metal such as magnesium or aluminum and secured in a suitable fashion to the frame-work of the helicopter or other device in which the transmission is operated. Said housing has a pair of bearings 11 and 12 concentrically disposed at opposite ends thereof. A drive shaft 13 is supported in bearing 11 and a driven shaft 14 is supported in bearing 12. Drive shaft 13 may be connected by means of the splined flange 15 directly or indirectly to the drive shaft of the prime mover. Driven shaft 14 may be connected to the main rotor of a helicopter, either directly or through a suitable pitch controlling mechanism (not shown). It is necessary that a speed reduction and torque multiplication of about 11–1 be provided between drive shaft 13 and driven shaft 14. This speed reduction is effected in the transmission shown, by means of reduction gearing designated generally by reference character 16.

Said transmission 16 is comprised of a drive pinion 17 formed on one end of a sleeve 18 which is loosely mounted on drive shaft 13, said pinion 17 meshing with a plurality of countershaft gears 19 and 20 rotatably mounted on countershafts 21 and 22, respectively, fixed in housing 10. The use of a plurality of countershafts reduces the tooth loading on the gears and permits the use of smaller and hence lighter gears. It also results in a balanced or symmetrical design which simplifies the construction of housing 10 and also the lubrication problems. Said countershaft gears 19 and 20 drive smaller countershaft gears 23 and 24 respectively, both of which mesh with an internal gear 25. Said internal gear 25 is connected by means of a one-way drive device 26 to output shaft 14.

Drive shaft 13 is connected to sleeve 18 through a multiple disc friction clutch 27, the clutch comprising a drum 28 rotated with drive shaft 13 and having internal splines 29 which drive a plurality of friction plates 30 axially slidable along splines 29. Between driving plates 30 are located the driven plates 31 which are splined to sleeve 18 so as to be rotatable therewith. Operating pressure is supplied by a pressure plate 32 which may be in the form of an annulus and which operates in a correspondingly annular chamber 33 formed in drum 28. An annular piston 34 likewise operates in chamber 33 and is directly contacted by oil under pressure supplied to chamber 33 by means hereinafter to be described. The reaction for the operating pressure is supplied by plate 35 likewise driven by splines 29 and restrained from axial movement along the splines in an upward direction by a snap ring 36.

One-way clutch 26 is comprised of a flange 37 spaced from and driven by ring gear 25, and preferably made integral therewith, said flange 37 being formed with axially extending teeth 38 which mesh with similarly axially extending teeth 39 on a sleeve 40. The normal direction of rotation of ring gear 25 is indicated by the arrow and the ends of teeth 38 and 39 are chamfered as shown so as to facilitate engagement of the teeth when the relative direction of rotation between the teeth is such that ring gear 25 tends to drive sleeve 40 and to prevent engagement of the sleeve when the relative direction of rotation is reversed, that is, when sleeve 40 tends to rotate ahead of ring gear 25. A spring 45 serves to maintain teeth 39 in contact with teeth 38 when the former are rotating faster than the latter. Sleeve 40 is formed with internal helical splines 41 which mesh with external helical splines 42 formed on driven shaft 14. Two snap rings 43 and 44 limit the downward and upward travel, respectively, of sleeve 40 along sleeve 42.

It will be apparent from the direction of the helical splines that if output shaft 14 should tend to continue rotating after ring gear 25 has slowed down or stopped, sleeve 40 will move axially upward on splines 42 until teeth 39 are free of teeth 38, and then the entire sleeve will rotate on shaft 14 relative to teeth 38. Just prior to the complete disengagement of teeth 39, spring 45 is compressed so that upon disengagement of teeth 39, the chamfered ends of both sets of teeth will ratchet over one another. When output shaft 14 slows down below the speed of gear 25, or is overtaken by gear 25, the ratcheting teeth will catch and the helical spline will then complete the engagement of the clutch. Thus clutch 26 drives only when ring gear 25 tends to rotate ahead of output shaft 14 and therefore functions as a positive one-way clutch.

Also drivingly connected to splines 42 is bevel gear 46 which meshes with a bevel pinion gear 47 on an output shaft 47a, arranged at an angle to the input shaft, for driving the tail rotor (not shown) of the helicopter, or other apparatus the function of which is related to the rotation of main rotor. It will be observed that pinion 47 rotates with bevel gear 46 and output shaft 14 whenever the latter is rotating whether power-driven through gears 16 or rotating solely under the aero-dynamic influence of the main rotor.

Oil under pressure for operating clutch 27 and for lubricating the one-way clutch and the transmission is supplied by a pump 48 which may be of any well known type, and for purposes of illustration is shown as a gear type pump having a pinion gear 49 driven by shaft 13 and meshing with a ring gear 50 loosely mounted in a pump housing 51. Said pinion gear 49 has one tooth less than gear 50 and the shape of the gear teeth is such that a seal is formed at all times between the input and output sides of the pump. It will be noted that the pump is located at the lowermost point in the transmission and actually is below the normal level of the oil in housing 10. The oil is pumped from the sump 52 through a filter 53 to the input passageway 54 of pump 48 and then through the pump to the output side 55 whence it flows in two paths, one path 56 leading to the hollow portion 57 of input shaft 13 and the other 58 leading to an annular chamber 59. From chamber 59 oil is fed by passageways 60 and 61 to the hollow countershafts 22 and 21, respectively, through radial bores 62 to the outside of shaft 22 and thence through openings 63 to the gear teeth and other portions of transmission 16. In passing between the gears and their shafts 21 and 22 to the openings 63 the flow of oil is materially restricted to permit the pressure to build up in chamber 59 and in hollow portion 57 of shaft 13.

Chamber 57 is closed off by means of a plug 64 having an opening 65 therein, the opening being closed by a plate 66 held thereagainst by a spring 67. Said plug 64 is provided at its outer end with an apertured plate 68 against which spring 67 bears. The tension in spring 67 is sufficient to cause a predetermined clutch-operating pressure to be built up in chamber 57 but will yield to higher pressures and allow the excess oil to pass through opening 65. The pressure so developed is transmitted through a conduit 69 to chamber 33 in drum 28 and thence through an opening 70 to a valve chamber 71 in which is a radially movable valve 72 adapted to close off opening 70 when drum 28 is rotated at a predetermined speed. A spring 73 normally keeps valve 72 in its radially inward position so as to allow the oil to escape from chamber 33 through port 70 and through a corresponding opening 74 into sump 52. It will be apparent that as long as valve 72 is in the position shown, no pressure can be built up in chambers 57 and 33 and hence clutch 27 will be inoperative. When drum 28 is rotated at or above the critical speed for which valve 72 is set, the valve will move outward, thus closing off opening 70 and permitting clutch operating pressure to be built up, the excess pressure as described above being relieved through opening 65 in plug 64.

In order to enable the operator to test the engine without engaging clutch 27, a manually operated valve 75 is provided in conduit 60, said valve being adapted to dump the oil in this conduit and therefore in chambers 57 and 59. In the position shown, the valve permits oil under pressure to flow into hollow countershaft 22 and does not destroy the pressure in the system. When valve 75 is made to assume its right hand position (Fig. 1) the flow of oil is cut off from the upper portion of conduit 60 and it passes around valve 75 into a dump port 76 whence it falls into the sump 52. Dump port 76 is sufficiently large to prevent any building up of pressure in chamber 57 so that should the engine be operated and input shaft 13 rotated at the speed at which valve 72 closes the port 70, there will not be sufficient pressure built up in the system to operate clutch 27.

One-way device 26 is lubricated by means of oil passing through plug 64 into chamber 81 in output shaft 14 and then into a side opening 82 and an oblique opening 83 from which point it ultimately flows into a chamber 84 formed by flange 37, output shaft 14, bevel gear 46 and a stamping 85 which connects the outer portion of bevel gear 46 with flange 37. Thus sleeve 40 operates in a chamber full of lubricant at all times, except of course, when plate 66 prevents the oil from passing through opening 65 in slot 64.

Under some circumstances the disconnecting function of the one-way device 26 may be performed by centrifugally controlled valve 72 and by the manually controlled valve 75. At low engine speeds, for example, clutch 27 is automatically disengaged by valve 72 and output shaft 14 is thus free to turn. At high engine speeds, valve 75 may be operated to again release clutch 27 and free output shaft 14. The one-way device might therefore be eliminated and shaft 14 could be directly connected to ring gear 25. A transmission so modified is disclosed in Fig. 2 as is also a modified power take-off mechanism which is somewhat lighter in weight for the same capacity, than the one disclosed in Fig. 1.

Referring now to Fig. 2 the drive shaft is shown at 86 driving a pump 87 and a clutch 88 which may be identical with clutch 27 in Fig. 1. Clutch 88 drives a sleeve 89 on which is formed a gear 90 meshing with one or more countershaft gears 91 mounted on a hollow countershaft 92 suitably retained in the housing 93. Said countershaft gear 91 is the larger of the two cluster gears, the second being shown at 94 and meshing with a ring gear 95 which is directly connected to an output shaft 96 for driving the main rotor of a helicopter.

Countershaft gear 91 has formed integral therewith a beveled gear 98 which meshes with a beveled pinion 99 rotatable about an axis which may be at right angles to the axis of rotation of bevel gear 98. Said bevel gear 99 drives a shaft 100 which in turn may be connected to the tail rotor or other mechanism of the helicopter. Suitable bearings 101, bearing retainers 102 and fasteners 103 may be used to support shaft 100 and gear 99 in housing 93.

The lubricating system for the transmission shown may be modified so that lubricant from the chamber 105 communicating with the high pressure side of the pump is conducted through a pipe 104 to hollow countershaft 92 and through a side opening 106 into a drilled passageway 107 in a threaded plug 108, the passageway 107 communicating with a chamber 109 in a support 110 for beveled pinion 99.

It is understood that in Fig. 2 clutch 88 is automatically operated by the same means shown in connection with clutch 27 in Fig. 1 and that a manually operated valve similar to valve 75 of Fig. 1 is used on the opposite side of pump 87. These two devices can render the gearing independent of drive shaft 86 so that should the engine stall while the helicopter is in the air it could be disconnected from the rotors and the latter could then operate to support the helicopter while it descended to the ground. It will be observed that beveled pinion 99 is meshed with beveled gear 98 which in turn is rotatable with countershaft gear 94 meshed with ring gear 95. It will thus be observed that the tail rotor driven from shaft 100 will always rotate when the main rotor driven from shaft 96 is rotated and hence full control of the helicopter may be had even though there is a power failure.

In both forms of power take-off, it is understood that in addition to driving the tail rotor, the power take-off may also drive other auxiliary apparatus such as the tachometers, governors, electric generators, etc., the continuous operation of which during flight is highly desirable, or that the take-off may drive such auxiliary apparatus exclusively, the tail rotor being driven by some other source of power.

It is understood that the foregoing description is merely illustrative of preferred embodiments of the invention and the scope of the invention therefore is not to be limited thereto but determined by the appended claims.

I claim:

1. In a helicopter, a transmission for driving the sustaining rotor thereof, comprising a housing, input and output shafts extending into the housing, gearing in the housing for providing a torque multiplication between the input and output shafts, an oil-operated clutch connecting the input shaft to the gearing, one-way positive clutch means for connecting the gearing to the output shaft, an oil reservoir surrounding the one-way clutch means, a second oil reservoir supplying oil under pressure to the oil-operated clutch, and a pressure relief valve limiting the pressure in the second reservoir, the oil escaping through the relief valve being conducted to the first reservoir such that the first reservoir is not filled until after clutch operating pressure is established in the second reservoir.

2. A transmission for driving the sustaining rotor of a helicopter as described in claim 1, including a power take-off driven by the output shaft, said power take-off defining a part of the first reservoir.

3. A transmission for driving the sustaining rotor of a helicopter as described in claim 1, and a valve in hydraulic communication with the second reservoir and responsive to the speed of the input shaft for dumping the pressure in the second reservoir when the input shaft is rotated at low speed.

4. In a helicopter, power transmitting means comprising an input shaft, an output shaft, a second output shaft connected to the first output shaft and driven thereby, and a one-way clutch mechanism connected between the input shaft and said first output shaft, said clutch mechanism including a toothed member connected with the input shaft, a helically splined member connected with the output shaft, and an axially shiftable member having helical splines meshing with the splines on said helically splined member and having teeth which mesh with said toothed member when the toothed member rotates faster than the helically splined member.

5. In a helicopter, power transmitting means comprising an input shaft, an output shaft, reduction gearing operatively disposed between said shafts and a one-way clutch means drivingly connected in series between said shafts, said clutch means including a toothed member connected with a reduction gearing, a helically splined member connected with one of the shafts, and a shiftable collar having helical splines meshing with the splines on said helically splined member and having teeth which mesh with said toothed member when the input shaft is the driver.

6. In a helicopter, a housing, input and output shafts extending into the housing, gearing within the housing for providing a torque multiplication between the input and output shafts, a clutch within the housing automatically connecting the input shaft to the gearing in response to predetermined speeds of the input shaft, and a one-way clutch drivingly connected in series between said shafts and including a toothed member connected with said gearing, a helically splined member connected with one of the shafts, and a shiftable collar having helical splines meshing with the splines on said helically splined member and having teeth which mesh with said toothed member when the input shaft is the driver.

7. Power transmitting means for a helicopter as described in claim 6 wherein the ends of the teeth on the collar and on the toothed member are chamfered to prevent engagement of said teeth until the collar and toothed member are substantially synchronized, and resilient means for causing the chamfered ends of the teeth to engage when the output shaft is the driver.

WILLIAM L. SHEPPARD.

REFERENCES CITED

The following references are of record in the file of this patent:

UNITED STATES PATENTS

| Number | Name | Date |
|---|---|---|
| 968,860 | Rummer | Aug. 30, 1910 |
| 1,052,986 | Tucker | Feb. 11, 1913 |
| 1,888,951 | Holland | Nov. 22, 1932 |
| 1,949,221 | Simpson et al. | Feb. 27, 1934 |
| 1,949,643 | Bannan | Mar. 6, 1934 |
| 1,960,141 | D'Ascanio | May 22, 1934 |
| 2,012,292 | Von Soden-Fraunhofen et al. | Aug. 27, 1935 |
| 2,074,342 | Platt | Mar. 23, 1937 |
| 2,122,218 | Sneed | June 28, 1938 |
| 2,135,073 | Gerhardt | Nov. 1, 1938 |
| 2,230,811 | Pecker | Feb. 4, 1941 |
| 2,287,302 | Gifford et al. | June 23, 1942 |
| 2,317,957 | Frudden | Apr. 27, 1943 |
| 2,318,259 | Sikorsky | May 4, 1943 |
| 2,340,241 | Woods | Jan. 25, 1944 |
| 2,385,889 | Skavinsky | Oct. 2, 1945 |
| 2,389,778 | Fedden et al. | Nov. 27, 1945 |

FOREIGN PATENTS

| Number | Country | Date |
|---|---|---|
| 387,900 | Great Britain | Feb. 16, 1933 |
| 491,513 | Great Britain | Sept. 5, 1938 |